United States Patent [19]

Lan et al.

[11] Patent Number: 5,116,261

[45] Date of Patent: May 26, 1992

[54] AUXILIARY COMPUTER PANEL TO COVER A DISK DRIVE ACCESS SIDE OF A COMPUTER CASING

[75] Inventors: Ray Lan; Collins Tsai, both of Taipei, Taiwan

[73] Assignee: Mitac International Corp., Hsinchu, Taiwan

[21] Appl. No.: 593,882

[22] Filed: Oct. 5, 1990

[51] Int. Cl.⁵ .................... A47B 81/00; E05C 3/16; H05K 7/00
[52] U.S. Cl. ................... 312/292; 292/225; 361/380
[58] Field of Search ............ 292/5, 6, 125, 174, 292/225, 235; 248/218.1; 312/293, 329, 330.1, 333, 292; 364/708; 361/344, 356, 380, 390, 392, 395

[56] References Cited

U.S. PATENT DOCUMENTS

| | | | |
|---|---|---|---|
| 2,077,160 | 4/1937 | Wilson | 361/390 |
| 4,034,169 | 7/1977 | Armstrong et al. | 361/356 X |
| 4,729,614 | 3/1988 | Nadler et al. | 312/292 |
| 4,851,963 | 7/1989 | Miller et al. | 361/356 |
| 4,937,771 | 6/1990 | Rumps, Jr. et al. | 361/380 X |

FOREIGN PATENT DOCUMENTS

| | | | |
|---|---|---|---|
| 3007488 | 9/1981 | Fed. Rep. of Germany | 292/5 |
| 3201916 | 8/1983 | Fed. Rep. of Germany | 361/344 |
| 2303296 | 11/1978 | France | 292/125 |
| 2605174 | 4/1988 | France | 364/708 |
| 556047 | 2/1957 | Italy | 312/292 |

*Primary Examiner*—Leo P. Picard
*Assistant Examiner*—Michael W. Phillips
*Attorney, Agent, or Firm*—Oblon, Spivak, McClelland, Maier & Neustadt

[57] ABSTRACT

A computer panel includes a panel member to be locked against the side of a computer casing from which the disk drives are accessed. The panel member has a window opening to access the disk drives. A cover is hinged to the panel member to close the window opening. A first lock is provided on the panel member to lock the panel member against the computer casing. A second lock is similarly provided on the panel member to lock the cover against the panel member. A key operable rotary actuator is mounted on the panel member and connected to the first and second locks to simultaneously actuate the first and second locks to unlock the cover from the panel member and the panel member from the computer casing when the rotary actuator is operated by a key.

8 Claims, 4 Drawing Sheets

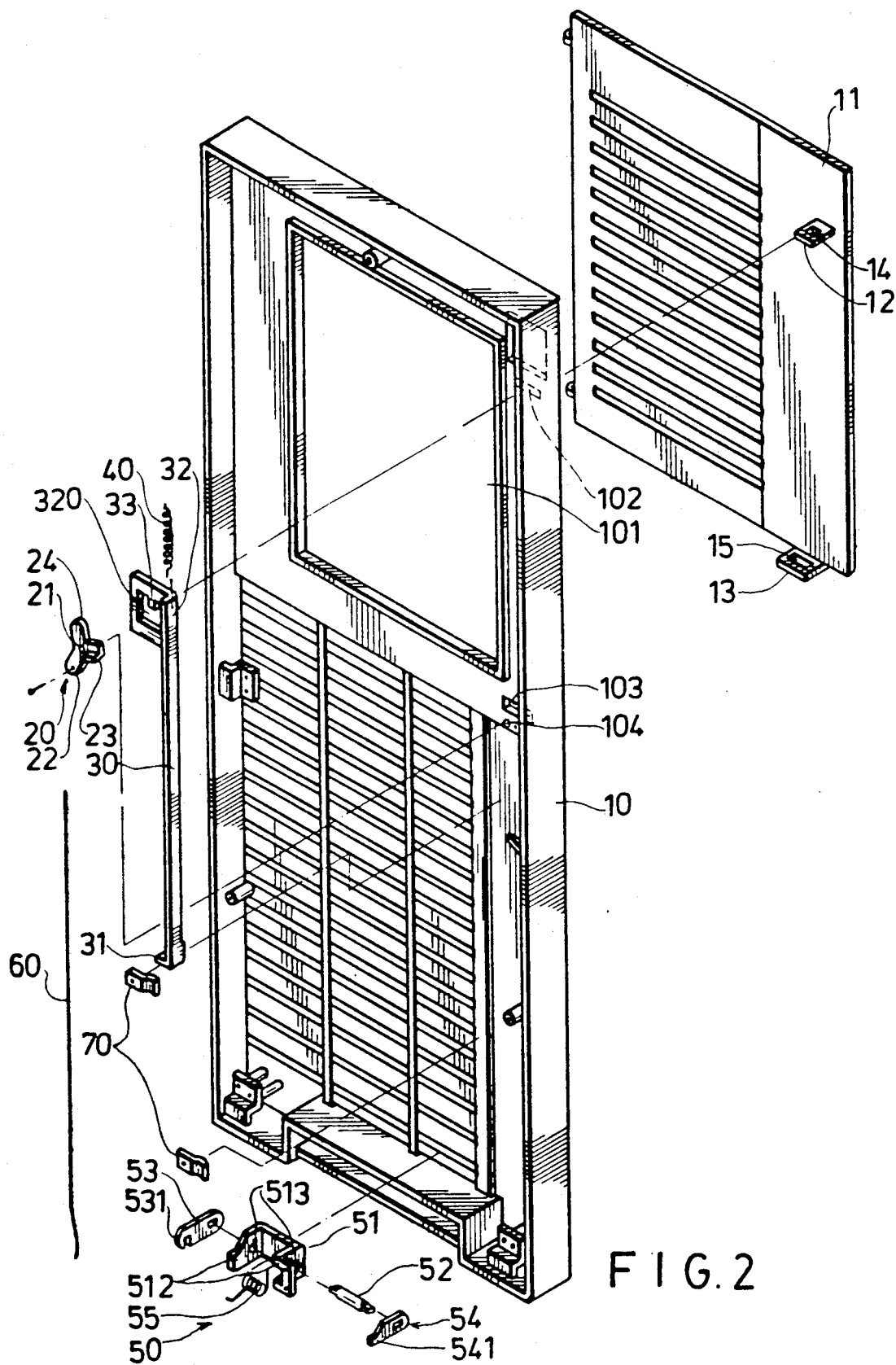

AUXILIARY COMPUTER PANEL TO COVER A DISK DRIVE ACCESS SIDE OF A COMPUTER CASING

BACKGROUND OF THE INVENTION

1. Field Of The Invention

The invention relates to a computer panel, more particularly to an auxiliary computer panel which can be locked against the side of a computer casing from which the disk drives are accessed.

The objective of the present invention is to provide a computer panel which can be locked against the side of a computer casing from which the disk drives are accessed to prevent unauthorized use of the computer by denying a prospective user access to the disk drives.

2. Summary of the Invention

Accordingly, a computer panel of the present invention includes a panel member to be locked against the side of a computer casing from which the disk drives are accessed. The panel member has a window opening to access the disk drives. A cover is hinged to the panel member to close the window opening. A first lock means is provided on the panel member to lock the panel member against the computer casing. A second lock means is similarly provided on the panel member to lock the cover against the panel member. A key operable rotary actuator is mounted on the panel member and connected to the first and second lock means to simultaneously actuate the first and second lock means to unlock the cover and the panel member when the rotary actuator is operated by a key.

The panel member has a latch opening adjacent to the window opening. The cover has an inwardly projecting slotted latch extending into the latch opening. The second lock means includes a locking post movably provided on the panel member. One end of the locking post engages the slotted latch to lock the cover to the panel member. A biasing member is provided to urge the locking post to engage the slotted latch. The other end of the locking post has an engaging groove. The rotary actuator has a radial arm received in the engaging groove. The rotary actuator is rotated by the key to move the locking post against the action of the biasing member to disengage the locking post from the slotted latch.

The first lock means includes a seat piece mounted to the panel member opposite the latch opening and having a pair of oppositely disposed ears, a rod rotatably provided between the ears, a lever member attached to one end of the rod, a fastening member attached to the other end of the rod and having a hook end to engage a notch provided on the computer casing side, a torsion spring disposed between the ears and surrounding the rod to urge the fastening member to engage the computer casing, and a cable having one end fixed to a second radial arm of the rotary actuator and another end fixed to the lever member. The rotary actuator is rotated by the key to pull the cable to correspondingly pull the lever member. The lever member rotates the rod and the fastening member against the action of the torsion spring to permit disengagement of the fastening member from the computer casing to unlock the panel member from the computer casing.

BRIEF DESCRIPTION OF THE DRAWINGS

Other features and advantages of this invention will become apparent in the following detailed description of the preferred embodiments with reference to the accompanying drawings, in which:

FIG. 2 is an exploded view of the preferred embodiment of a computer panel as shown in FIG. 1;

DETAILED DESCRIPTION OF THE PREFERRED EMBODIMENTS

Figure 1:
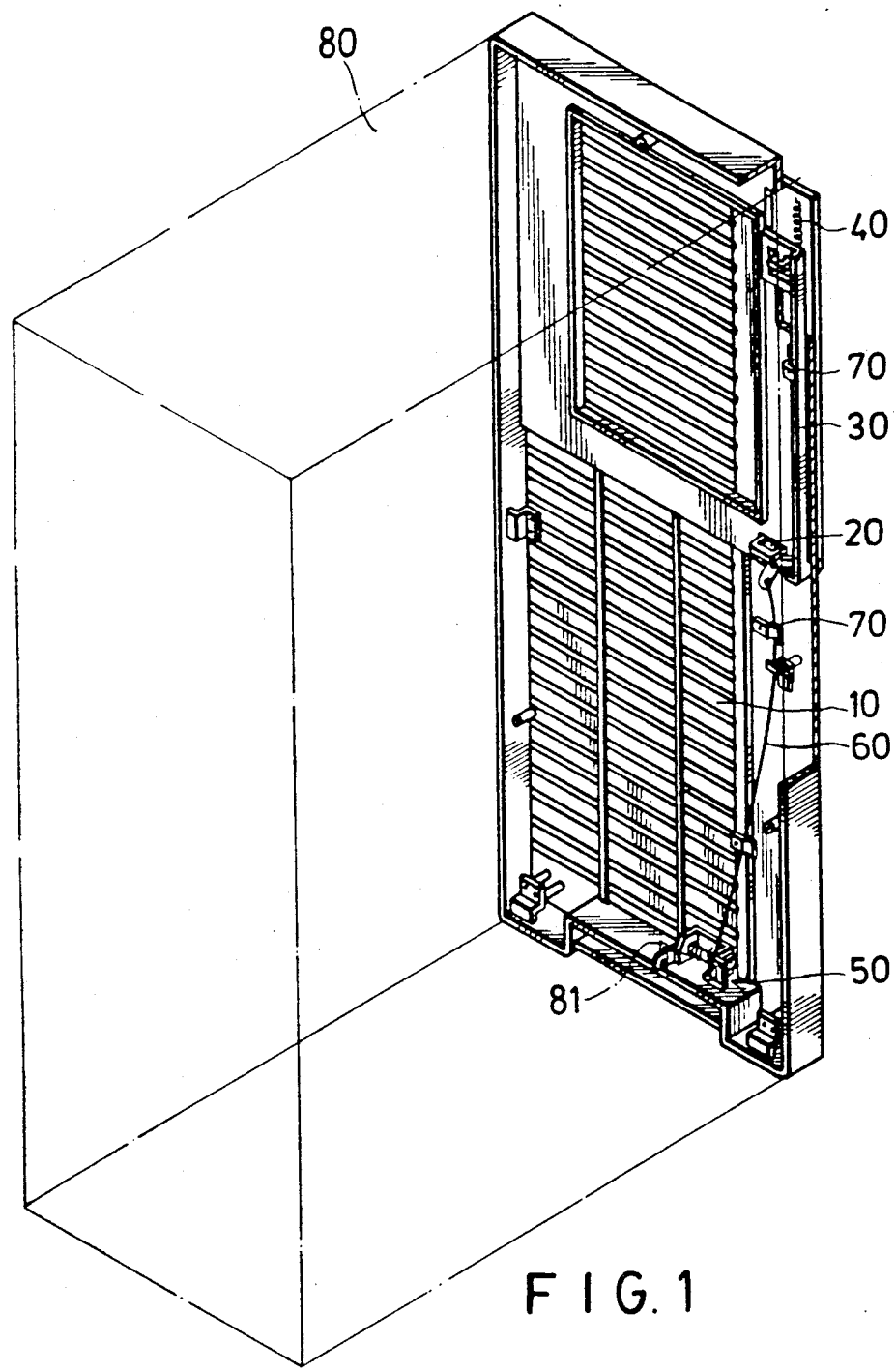
FIG. 1 illustrates the first preferred embodiment of a computer panel according to the present invention when locked against one side of a computer casing.

Referring to FIGS. 1 and 2, the preferred embodiment of a computer panel according to the present invention comprises a panel member 10, a cover 11, a rotary actuator 20, a locking post 30, a biasing member 40, a fastening device 50, a cable 60, and guide members 70. The computer panel is used to cover one side of a computer casing 80 from which the disk drives are accessed.

The panel member 10 has a rectangular window opening 101 to access the disk drives (not shown) provided on the computer casing 80. The cover 11 has lug members 111 which are each pivotably hinged on a pin (not shown) provided on the panel member 10 such that cover 11 serves as a hinged closure for window opening 101. The cover 11 has a first latch 12 that projects into a latch opening 102 adjacent to the window opening 101 of the panel member 10, and a second latch 13 disposed opposite to the first latch 12 and similarly projecting into a latch opening 103 of the panel member 10. The latches 12 and 13 have slots 14 and 15, respectively.

The rotary actuator 20 is a key operable member having a key hole 21 aligned with a key opening 104 provided on the panel member 10. The locking post 30 has a transverse flange 31 on one end to engage a radial arm 23 of the rotary actuator 20. The other end of the locking post 30 is formed with a rectangular frame 32 having a central opening 320. A tooth 33 projects into the rectangular opening 320. The latch 12 extends into the rectangular opening 32 and the tooth 33 is received in the slot 14 (as shown in FIG. 1).

The biasing member 40 has one end fixed to the panel member 10 near an extreme edge of the same. The other end of the biasing member 40 is fixed to the rectangular frame 32 of the locking post 30 so that biasing member 40 is held in tension. The fastening device 50 includes a seat 51 fixed to the panel member 10 opposite to the latch opening 102. The seat 51 has oppositely disposed ears 512. The ears 512 have aligned through holes 513 to receive two ends of a rod 52. One end of the rod 52 is attached to a fastening member 53. The other end of the rod 52 is attached to a lever member 54. Movement of the lever member 54 correspondingly moves the rod 52 and the fastening member 53. A torsion spring 55 surrounds the portion of the rod 52 disposed between the ears 512. One end of the torsion spring 55 is fixed to the rod 52. The other end of the second biasing member 55 is fixed to the fastening member 53.

The cable 60 has one end fixed to a radial arm 22 of the rotary actuator 20. The other end of the cable 60 is fixed to one end 541 of the lever member 54. Movement of the rotary actuator 20 thus correspondingly moves the lever member 54. The positioning members 70 are fixed to different parts of the panel member 10 to guide the movement of the locking post 30 and the cable 60.

Referring once more to FIG. 1, the panel member 10 is locked to a front panel of the computer casing 80. The fastening member 53 extends into a notch 81 formed on the front panel of the computer casing 80. The fastening member 53 has a hook end 531 which engages the computer casing 80 at the notch 81. The fastening member 53 thus locks the panel member 10 to the computer casing 80.

Figures 3A, 3B:
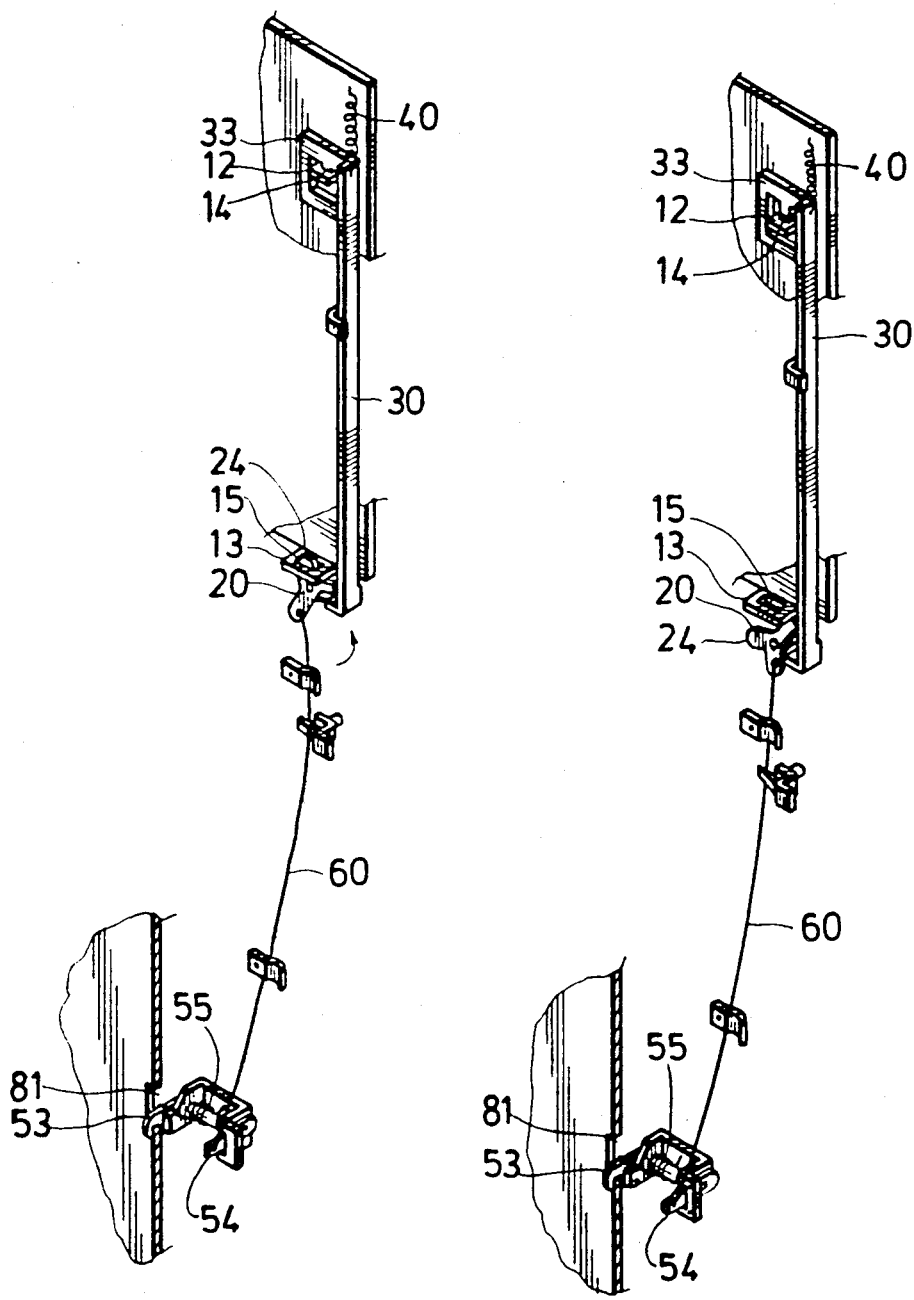
FIGS. 3A, 3B, and 3C show the first preferred embodiment at various stages of operation to illustrate the unlocking process.
Figure 3C:
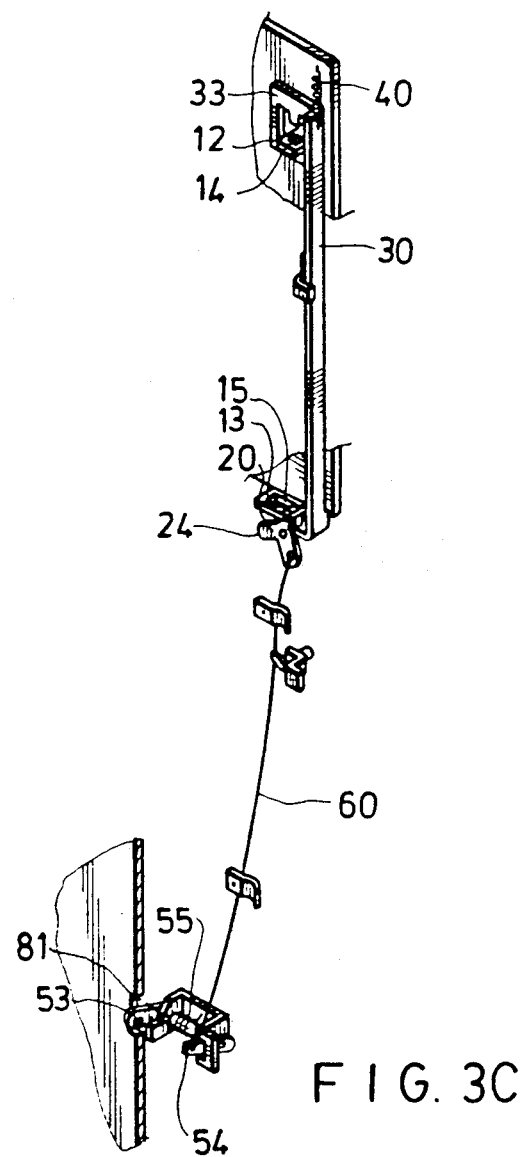

FIGS. 3A, 3B and 3C illustrate the unlocking operation of the preferred embodiment. Referring to FIG. 3A, when the preferred embodiment is still in a locked position, the tooth 33 extends into the slot 14 of the latch 12. The hook end 531 of the fastening member 53 engages the computer casing 80 at the notch 81. The rotary actuator 20 has a radial arm 24 extending into the slot 15 of the latch 13. Referring to FIG. 3B, when a key is inserted into the rotary actuator 20 to operate the same, the radial arm 24 of the rotary actuator 20 moves out of the slot 15. The radial arm 23 of the rotary actuator 20 is lifted from transverse flange 31 of the locking post 30, allowing biasing member 40 to disengage the tooth 33 from the latch 12. The cover 11 is now unlocked from the panel member 10. Referring to FIG. 3C, further rotation of the rotary actuator 20 pulls the cable 60 to correspondingly move the lever member 54. The lever member 54 rotates the rod 52 to correspondingly move the fastening member 53 to disengage the panel member 10 from the computer casing 80.

Accordingly, when engaging the cover 11 to the panel member 10, the rotary actuator 20 is rotated to urge the locking post 30 against the force of biasing member 40 to allow the latches 12 and 13 to protrude into the latch opening 102. When the key is extracted, the radial arm 24 of the rotary actuator 20 once more projects into the slot 15 of the latch 13. The biasing member 40 is held in tension by the cooperation of radial arm 23 with transverse flange 31. During the unlocking operation, the torsion spring 55 is wound such that when the key is extracted, the torsion spring 55 urges the fastening member 53 to once more engage the computer casing 80 at the notch 81.

Figure 4:
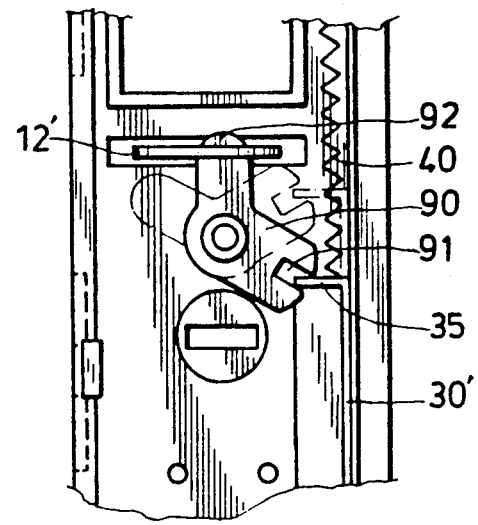
FIG. 4 illustrates the second lock means of a second preferred embodiment of a computer panel according to the present invention.

A second preferred embodiment of the computer panel according to the present invention is shown in FIG. 4. The locking post 30' has a transverse flange end 35 connected to one end of the biasing member 40. A substantially V-shaped plate 90 is hinged to the panel member 10'. A hook end 91 of the V-shaped plate 90 engages the flange end 35 of the locking post 30'. The other end 92 of the V-shaped plate 90 extends into the slot (not shown) of the latch 12'. When the rotary actuator (not shown) is rotated to urge the locking post 30' upward, the V-shaped plate 90 is rotated such that the end 92 moves out of the slot, thereby unlocking the cover (not shown) from the panel member 10'.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

We claim:

1. An auxiliary computer panel to cover a front panel of a computer casing from which disk drives are accessed, said front panel being provided with a first engaging means, said auxiliary computer panel comprising:
   a panel member having a window opening to access said disk drives;
   a cover hinged to said panel member to close said window opening;
   a first lock means provided on said panel member and including a second engaging means releasably engaging said first engaging means so as to lock said panel member against said front panel of said computer casing;
   a second lock means provided on said panel member to lock said cover against said panel member; and
   a key operable actuating member mounted on said panel member and connected to said first and second lock means to simultaneously actuate said first and second lock means to unlock said cover from said panel member and said panel member from said front panel when said key operable actuating member is operated by a key.

2. The auxiliary computer panel as claimed in claim 1, wherein said panel member has a latch opening adjacent to said window opening, said cover having an inwardly projecting latch with a slot, said latch extending into said latch opening; said second lock means comprising a locking post movably provided on said panel member, said locking post having a first end to engage said latch at said slot to lock said cover to said panel member; and a biasing member having one end fixed to said panel member and another end urging said first end of said locking post to engage said latch at said slot.

3. The auxiliary computer panel as claimed in claim 2, wherein said locking post has a second end with a transverse flange; said key operable actuating member including a rotary actuator having a radial arm engaging said transverse flange, said rotary actuator being rotatable so as to move said locking post against the action of said compression spring to disengage said first end of said locking post from said slot of said latch.

4. The auxiliary computer panel as claimed in claim 3, wherein said panel member further has a second latch opening, said cover having a second inwardly projecting latch opposite said first latch, said second latch having a second slot and extending into said second latch opening, said rotary actuator having a second radial arm extending into said second slot when said cover is locked against said panel member, said second radial arm moving out of said slot when said rotary actuator is rotated to unlock said cover from said panel member.

5. The auxiliary computer panel as claimed in claim 2, wherein said key operable actuating member includes a rotatory actuator having a radial arm; said first lock means further comprising a seat piece mounted to said panel member opposite said latch opening, said seat piece having a pair of oppositely disposed ears, a rod rotatably provided between said ears, a lever member attached to one end of said rod, said second engaging means being attached to the other end of said rod and having a hook end engageable with said first engaging means of said front panel, a torsion spring disposed between said ears and surrounding said rod urging said second engaging means so as to engage said first engaging means, and a cable having one end fixed to said radial arm of said rotary actuator and another end fixed to said lever member, said rotary actuator being rotatable so as to pull said cable to correspondingly pull said lever member so that said lever member rotates said rod and said second engaging means against the action of said torsion spring so as to permit disengagement of said second engaging means from said computer casing to unlock said panel member from said computer casing.

6. The auxiliary computer panel as claimed in claim 2, further comprising a plurality of spaced guide members fixed to said panel member to guide the movement of said locking post.

7. The auxiliary computer panel as claimed in claim 2, wherein said first end of said locking post post is formed with a closed loop frame having a central opening, and a tooth projecting into said central opening and to be received in said slot.

8. The auxiliary computer panel as claimed in claim 2, wherein said first end of said locking post is formed with a transverse flange, said computer panel further comprising a substantially V-shaped plate hinged to said panel member, said V-shaped plate having a first hook end engaging said transverse flange and a second end extending into said slot of said latch, said V-shaped plate being rotatable by said locking post such that said second end of said V-shaped plate moves out of said slot so as to unlock said cover from said panel member.

* * * * *